(12) United States Patent
Cattaneo et al.

(10) Patent No.: US 7,804,908 B2
(45) Date of Patent: Sep. 28, 2010

(54) METHOD OF CALIBRATING THE TRANSMISSION CHAIN OF A WIRELESS TRANSCEIVER AND CORRESPONDING WIRELESS TRANSCEIVER

(75) Inventors: Chiara Cattaneo, Sergy (FR); Philippe Rouzet, Argonay (FR); Régis Cattenoz, Annemasse (FR); Patrick Conti, Ambilly (FR)

(73) Assignee: STMicroelectronics N.V., Amsterdam (NL)

( * ) Notice: Subject to any disclaimer, the term of this patent is extended or adjusted under 35 U.S.C. 154(b) by 852 days.

(21) Appl. No.: 11/686,545

(22) Filed: Mar. 15, 2007

(65) Prior Publication Data

US 2007/0297523 A1    Dec. 27, 2007

(30) Foreign Application Priority Data

Mar. 15, 2006    (EP)    ................................. 06005286

(51) Int. Cl.
*H04K 1/10*    (2006.01)

(52) U.S. Cl. ..................................................... 375/260
(58) Field of Classification Search ................. 342/368; 370/208; 375/260; 455/103
See application file for complete search history.

(56) References Cited

U.S. PATENT DOCUMENTS

| 2002/0012331 A1* | 1/2002 | Takano ........................ 370/335 |
| 2002/0159532 A1* | 10/2002 | Wight ......................... 375/260 |
| 2003/0160719 A1* | 8/2003 | Hancock ...................... 342/368 |
| 2004/0008617 A1* | 1/2004 | Dabak et al. ................. 370/208 |
| 2004/0219892 A1 | 11/2004 | Vaidyanathan et al. ....... 455/103 |

* cited by examiner

*Primary Examiner*—David C Payne
*Assistant Examiner*—Leon-Viet Q Nguyen
(74) *Attorney, Agent, or Firm*—Lisa K. Jorgenson; Allen, Dyer, Doppelt, Milbrath & Gilchrist, P.A.

(57) ABSTRACT

A calibration is performed tone per tone during interframe spacing. A peak detection is used for measuring the level of the corresponding signal, and a gain correction coefficient is stored for correcting the digital complex modulation coefficients provided by the mapping.

30 Claims, 5 Drawing Sheets

METHOD OF CALIBRATING THE TRANSMISSION CHAIN OF A WIRELESS TRANSCEIVER AND CORRESPONDING WIRELESS TRANSCEIVER

FIELD OF THE INVENTION

The invention relates to wireless communication systems, and more particularly, to management of the transmit power of wireless transceivers. A non-limiting application is directed to devices operating according to the Ultra Wide Band (UWB) standard based on a multiband OFDM (Orthogonal Frequency-Division Multiplexing), called MBOA (Multiband OFDM Alliance).

BACKGROUND OF THE INVENTION

Orthogonal Frequency-Division Multiplexing (OFDM) is a method of digital modulation in which a signal is split into several narrowband channels (sub-carriers) at different frequencies.

The transmit power for WLAN or WPAN devices in a network needs to be precisely controlled. It is beneficial to maximize the transmit power level to enhance the range and the quality of transmission. On the other hand, it is mandatory to stay below the maximum transmit peak power allowed by the spectrum regulation. However, dispersion of integrated circuit characteristics, as well as variations mainly due to operating temperatures cause a lack of precision in the transmit power level.

It is thus highly desirable to constantly calibrate the peak transmit power to its optimum level without adding complexity to the WLAN device. One difficulty comes from the fact that in an OFDM based transmission, the frequency band of the transmit signal is generally large or even very large (e.g., hundreds of megahertz). This results in variations of the signal level across the band. Another difficulty is in precisely measuring the transmitted energy across the whole frequency band.

One additional difficulty is that, at any time, no spurious emission is authorized by the Regulation. Thus, measurement of the transmit power needs to be done without radiating energy externally to the tested device.

SUMMARY OF THE INVENTION

In view of the foregoing background, an object of the invention is to provide a dynamic transmit power calibration method that can be put in place with minimum modification of the hardware, and without spurious in-air transmission.

Another object of the invention is to provide a calibration method that can be performed with relaxed time constrains.

This and other objects, advantages and features in accordance with the invention are provided by a method of transmitting a signal from a transmission chain of a wireless transceiver during transmission periods separated by silence periods. The method may comprise performing a transmission phase during the transmission periods, including providing initial modulation coefficients in the frequency domain, and respectively modulating sub-carriers to be transmitted from the initial modulation coefficients.

The method may further comprise associating storage means or storage to each sub-carrier, and performing a calibration phase. The calibration phase may comprise the following:

a) providing a reference modulation coefficient in the frequency domain associated to a chosen sub-carrier, and measuring the power of the corresponding reference signal delivered at a location of the transmission chain, during one silence period, b) calculating from the result of the measurement and from the reference modulation coefficient, a gain correction coefficient for that sub-carrier, c) storing the calculated gain coefficient in the storage means associated to the sub-carrier, and d) repeating steps a) to c) for other chosen sub-carriers, the step being a) respectively associated to all chosen sub-carriers performed during a same or different silence periods.

The transmission phase may further comprise correcting the initial modulation coefficients with the content of the corresponding storage means.

In other words, the dynamic measurement of the transmit power is advantageously made tone per tone (a tone is equivalent to an OFDM sub-carrier, for example), during inter-packets or inter-frames silences, for example. The invention is compliant with wireless systems where packets are transmitted frequently, ideally at regular time intervals (TDMAs scheme). The invention is also compliant to accommodate other transmission timing schemes, either deterministic or non-deterministic.

In a particular but non-limiting example, the signal may be a UWB signal modulated according to a MB-OFDM modulation scheme, as in accordance with the MBOA standard, for example.

It may only be necessary to perform step a) of the calibration phase during a silence period. The other steps of the calibration phase can be performed either during one or several silence periods or during the transmission phases. In other words, steps b) and c) can be temporally decorrelated from the time sequence of the signal transmission. Thus, relaxed time constrains may be obtained.

The location where the power measurement is performed may preferably be close to the antenna, for example, after the power amplifier stage of the transmission chain. Performing the power measurement just at the output of the power amplifier stage may allow the highest level measurement for better accuracy while keeping advantage of attenuation and switch isolation from the antenna to suppress spurious in-air emission in the calibration phase.

Due to the feature of generating each tone individually, it may be possible to use such a peak detector instead of an RMS detector, for measuring the power of the reference signal. This permits one to obtain a more simple, low cost and easily integrated circuit implementation. In particular, it requires less filtering to take out the envelop of the OFDM signal. Accuracy of the measurement may also better.

When the signal is an UWB signal modulated according to the MBOA standard, step a) and eventually the other steps of the calibration phase are preferably performed within the silence periods (called IFS: Interframe spacing) separating successive transmission frames.

The present invention permits in particular correction of the variation in the transmit spectrum flatness caused by temperature variation. However, in semiconductor technology, these variations result in significant changes only after a few seconds or more. Thus, it is advantageous to start the calibration phase upon reception of a control signal, delivered for example, by an upper control layer such as a MAC layer, for example every three or four seconds.

Further, in the MBOA standard, in particular, 3*128 tones or sub-carriers are transmitted within three sub-bands and no noticeable variation in the spectrum can be detected within an adjacent group of four or eight tones. Thus, one power measurement per four or eight adjacent tones may generally be sufficient and, in such a case, the gain correction coefficient obtained from this measurement may be valid for all the four or eight adjacent tones.

Thus, more generally, according to an embodiment of the invention, the gain correction coefficient calculated in step b) is valid for a group of n adjacent sub-carriers including the chosen sub-carrier. The calculated gain correction coefficient is stored in the storage means associated to the group. Step d) comprises successively respectively repeating steps a) to c) for respective sub-carriers chosen among successive respective adjacent groups of n sub-carriers.

According to another aspect of the invention, a wireless transceiver comprises a transmission chain including mapping means or a mapper adapted to deliver initial modulation coefficients in the frequency domain, antenna means or antenna adapted to transmit a signal including sub-carriers respectively modulated from the initial modulation coefficients, and control means or a controller adapted to authorize the transmission during transmission periods separated by silence periods.

The transceiver may further comprise calibration means including storage means associated to each sub-carrier, generating means adapted to deliver a reference modulation coefficient in the frequency domain associated to a chosen sub-carrier, and measurement means connected at a location of the transmission chain and adapted to measure at the location the power of the reference signal corresponding to the reference modulation coefficient.

The transceiver may yet further comprise processing means adapted to calculate from the result of the measurement and from the value of the reference modulation coefficient a gain correction coefficient for that sub-carrier and to store the calculated gain correction coefficient in the storage means associated to the sub-carrier. Calibration control means may be adapted to activate at least the generating means and the measurement means during one or several silence periods for several chosen sub-carriers. Correction means may be connected to the output of the mapping means and to the storage means and adapted to correct each initial modulation coefficient with the content of the corresponding storage means. The correction means may be multiplication means, for example.

The calibration means may further comprise controllable coupling means connected between the location and the measurement means. The calibration control means may be adapted to control the coupling means such that the measurement means are only coupled to the location when the calibration means are activated.

In other words, it may be advantageous to add a switch or an equivalent circuit for example, in order to insert the measurement means only in the calibration mode, so that no perturbation is caused by the measurement means when the transceiver is in operational or transmission mode.

The storage means may be adapted to store a set of initial values for the gain correction coefficients. The silence periods may be spaces separating successive transmission frames.

The calculated gain correction coefficient is valid for a group of n adjacent sub-carriers including the chosen sub-carrier. The calculated gain correction coefficient may be stored in the storage means associated to the group. The calibration control means may be adapted to respectively activate the calibration means during one or several silence periods for respective sub-carriers chosen among successive respective adjacent groups of n sub-carriers.

BRIEF DESCRIPTION OF THE DRAWINGS

Other advantages and features of the invention will appear on examining the detailed description of different embodiments, these being in no way limiting, and of the appended drawings in which.

DETAILED DESCRIPTION OF THE PREFERRED EMBODIMENTS

Figure 1:
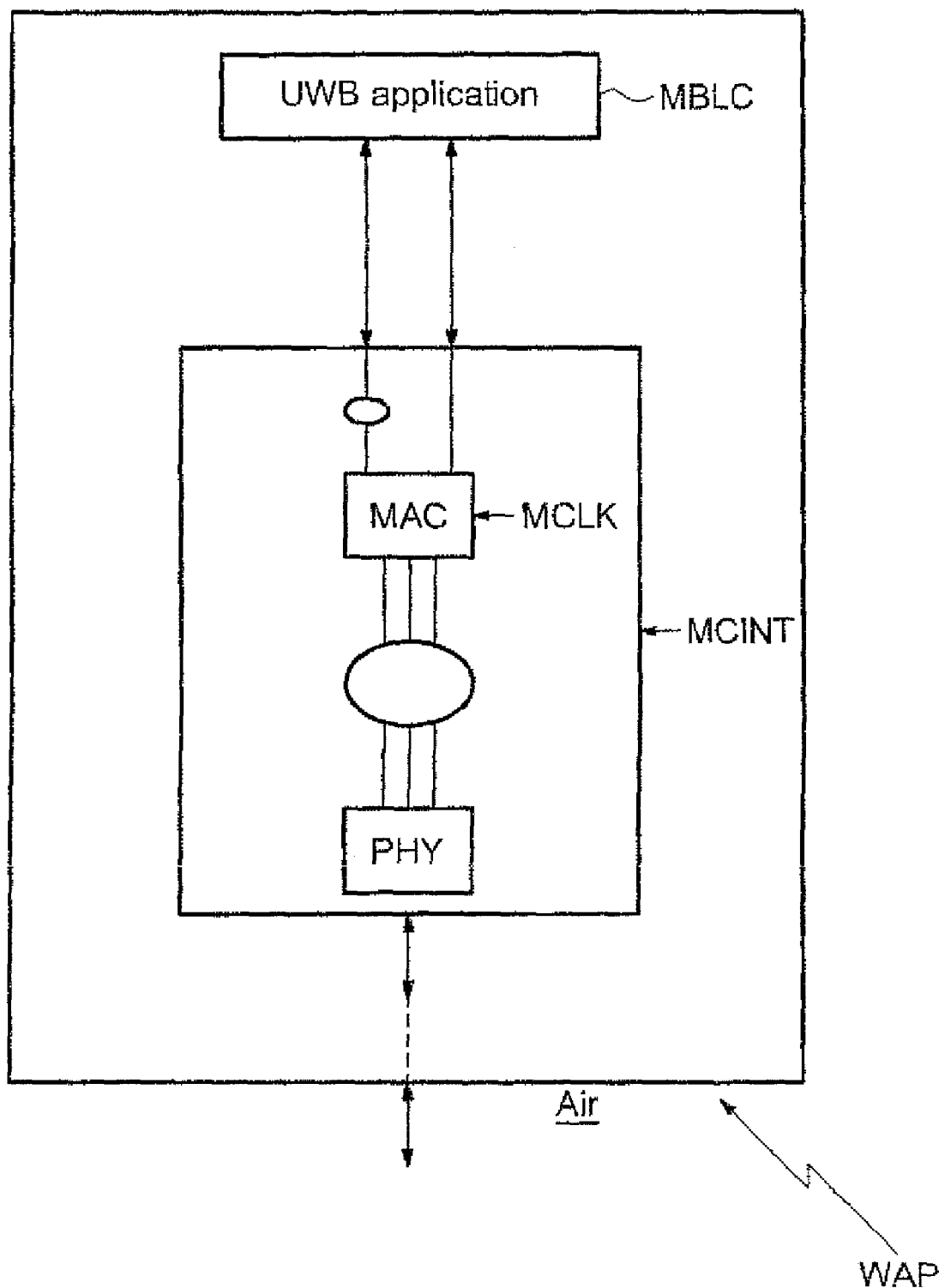
FIG. 1 is a block diagram illustrating the internal protocol structure of a wireless transceiver according to the invention.

FIG. 1 discloses an example of a wireless communication apparatus or transceiver WAP belonging to a non-coordinated communication system such as a WLAN (Wireless Local Area Network) or a WPAN (Wireless Personal Area Network). Such a wireless apparatus WAP belongs for example to an OFDM based Ultra Wide Band Communication system.

WPAN MAC protocols have a distributed nature where there is no central coordinator terminal or base station to assign the medium access. In contrast to a mobile radio terminal, a WPAN transceiver has a much higher flexibility to allocate the transmission slot and formats. The allocation of the communication resources is a distributed process. The allocation to a specific time slot in the super frame can be modified from one super frame to the next. The controlling entity is the WPAN-MAC layer of the communicating terminals. The allocation is based on the requested data rate and the type of service to be transmitted. Furthermore, the available resources are taken into account in the allocation process. The MAC layer requests a reservation for a specific time slot or a number of time slots based on these constraints. These constraints can be split into local constraints, like the data rate to be transmitted or received and network wide constraints like the already existing slot reservation.

An example of distributed WPAN-MAC is MBOA MAC. The MBOA standard draft is based on a UWB technology and is planned to be used in the frequency band between 3.1 and 10.7 GHz. First implementations using the standard work in the frequency range between 3.1 GHz and 5.0 GHz.

The wireless apparatus WAP comprises an OFDM based UWE communication interface MCINT connected between the UWB application block MBLC and the communication medium (e.g., air). This communication interface MCINT comprises an UWB MAC layer clocked by a clock signal MCLK, and connected to the PHY layer and to the UWB application block MBLC.

For further details concerning the MAC layer and the PHY layer of the communication interface MCINT, one skilled in the art may refer to the MBOA PHY layer Technical Specification, Version 1.0, January 2005, and to the MBOA MAC layer Technical Specification, Version 0v7, October 2004. The MAC layer manages in particular the emission/reception of the UWB data stream and is incorporated by software in a control processor.

Figure 3:
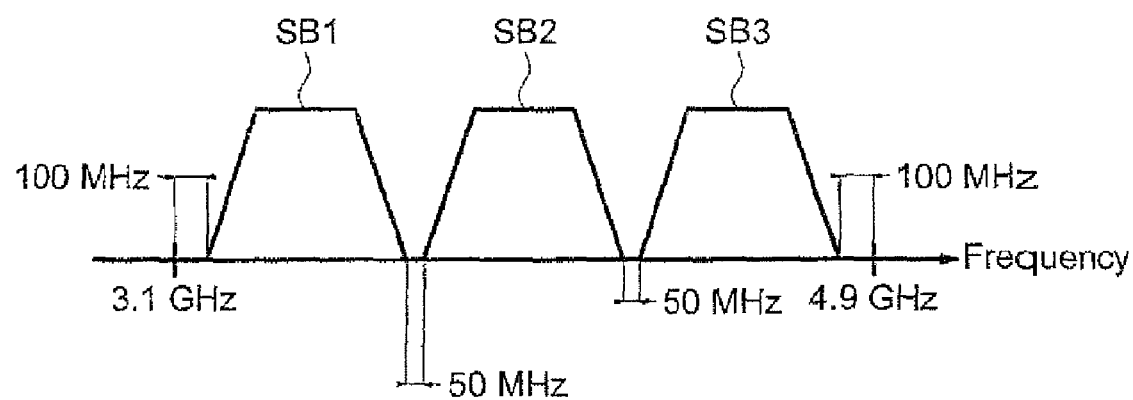
FIG. 3 illustrates MBOA hopping sub-bands according to the invention.

In FIG. 3 it can be seen that the main band of frequencies used for the operation (transmission and/or reception) of the transceiver lies between 3.1 GHz and 4.9 GHz. Further, the frequency band is subdivided into three sub-bands SB1, SB2, SB3 called hopping sub-bands, which are mutually spaced. More precisely, there is a guard interval of 100 MHz between the lower limit (3.1 GHz) of the frequency band and the beginning of the first sub-band SB1 as well as between the end of the third sub-band SB3 and the upper limit (4.9 GHz) of the frequency band.

Further, two adjacent sub-bands are spaced by a guard interval of 50 MHz. The allocation of the sub-bands during the transmission is made according to a predetermined hopping sequence.

Figure 2:
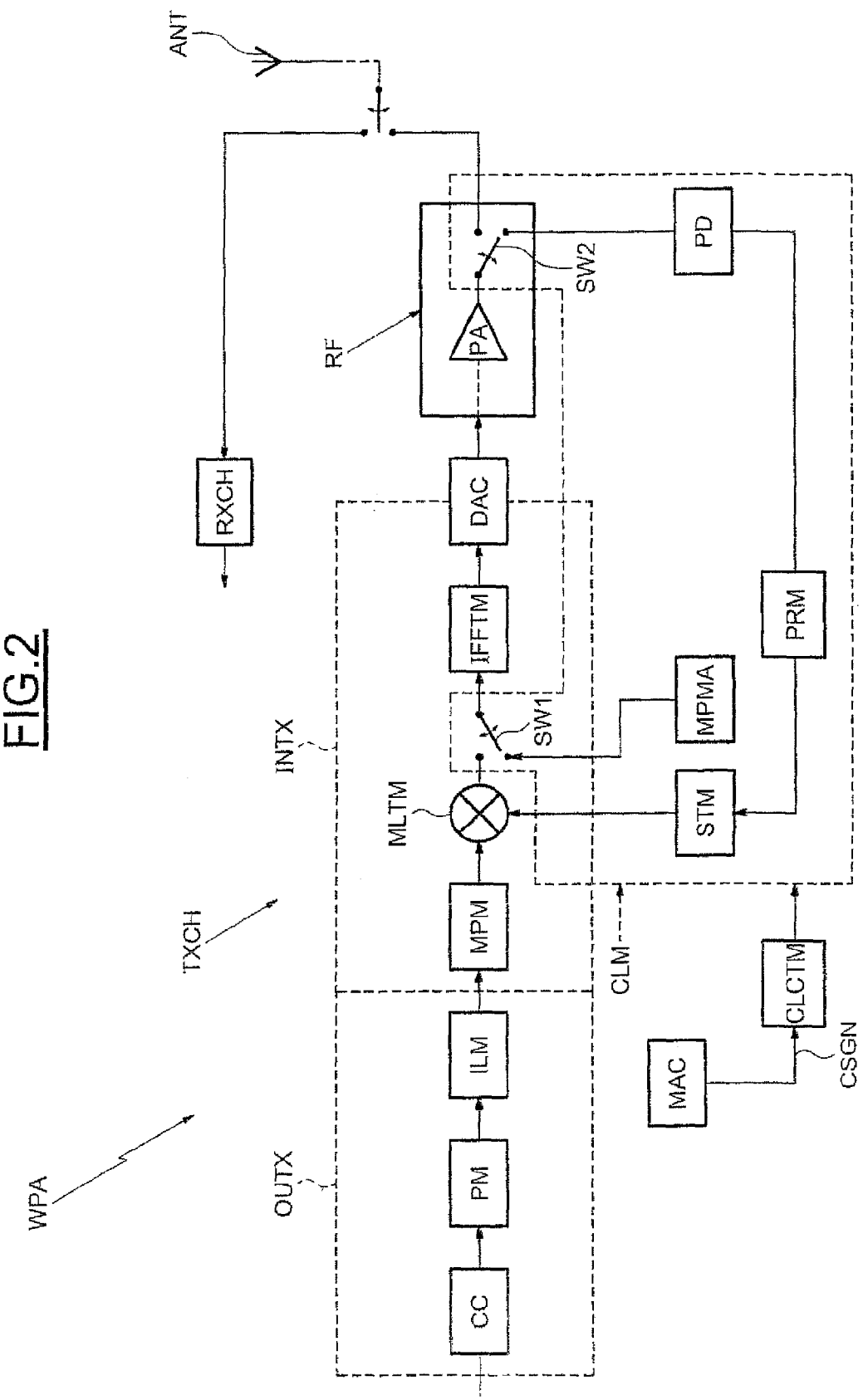
FIG. 2 is a block diagram illustrating in greater detail the internal structure of the transceiver of FIG. 1.

Referring now more particularly to FIG. 2, the communication interface of the transceiver WPA comprises a transmission chain TXCH and a receiving chain RXCH, both coupled to an antenna ANT through a switch or analog circuit.

The transmission and receiving chains work in a half duplex scheme. In an operating mode the transmit level is much higher than the received level, making difficult simultaneous transmission and reception of the transmitted waveform. This is the reason why a switch or an attenuation system generally exists in order to couple each chain to the antenna only when needed.

Conventionally, a MB-OFDM digital baseband symbol is composed of 128 sub-carriers (corresponding to data, pilots, etc.). The transmitted data is generated by computing the IFFT (Inverse Fast Fourier Transform) of 128 frequency-domain digital baseband samples and padding the result with 37 zeroed samples. The whole symbol (165 samples) has a duration of 312.5 ns.

As depicted in FIG. 2, a transmitter TX according to an embodiment of the invention comprises a digital baseband stage including an outer transmission block OUTX and an inner transmission block INTX) coupled to an analog radio frequency stage RF by a digital-to-analog conversion stage DAC. In a conventional manner, the transmission chain comprises an encoder CC, for example a convolutional encoder, receiving data from source coding means and delivering a bits stream to puncturing means PM which delivers a punctured bits stream.

Interleaving means ILM are connected to the output of the puncturing means and are followed by mapping means MPM which map the bits into symbols according to a modulation mapping scheme depending on the kind of used modulation, for example a BPSK modulation or more generally a QAM modulation.

The successive symbols delivered by the mapping means MPM are MB-OFDM digital baseband symbols. Each symbol is a group containing 128 modulation coefficients respectively associated to 128 sub-carriers to be modulated accordingly. Of course, a group of 128 samples (modulation coefficients) is delivered on the I branch whereas another corresponding group of 128 samples is delivered on the Q branch.

These successive frequency domain groups of digital complex modulation coefficients, which are called "initial modulation coefficients", are then delivered, after correction (as will be explain more in detail below), to an OFDM modulator IFFTM, which performs an IFFT processing in order to associate a modulation coefficient to a sub-carrier and to form an OFDM symbol which comprises 128 modulated sub-carriers.

The means belonging to the digital baseband stage may be realized for example by software within a microprocessor. Another possibility would include realizing at least some of these means, for example IFFT means, by specific ASICs.

The time-domain symbols delivered by the OFDM modulator IFFTM are then processed in the conventional radio frequency stage RF after having been converted into a DAC stage, and before being transmitted through the air via the antenna ANT. Further to these conventional means, the physical layer PHY of the communication interface of the wireless transceiver also comprises calibration means CLM connected to the transmission chain through two controllable switches SW1 and SW2.

The first switch SW1 is connected upstream the OFDM modulator IFFTM whereas the second switch SW2 is located at a second location of the transmission chain. This second location is located after the power amplifier stage of the stage RF. Further, multiplication means MLTM are connected between the mapping means MPM and the first switch SW1.

The calibration means CLM comprises a conventional peak detector PD followed by processing means including a conventional circuit adapted to transform the measured value delivered by the peak detector into its digital representation for further exploitation by the other components of the processing means.

The calibration means comprises also storage means STM associated to each sub-carrier. More precisely, these storage means may comprise in this example 128 registers respectively associated to the 128 tones or sub-carriers respectively modulated by the 128 digital initial modulation coefficients delivered by the mapping means. Another possibility includes using a single memory having 128 memory cells located at 128 different addresses.

The calibration means CLM further comprises generating means MPMA adapted to deliver in the frequency domain a reference modulation coefficient associated to a chosen sub-carrier (a chosen tone). Practically, the generating means may be realized identical to the mapping means MPM.

The calibration means are controlled by calibration control means CLCTM which are adapted to activate the calibration means during one or several silence periods for several chosen sub-carriers, as will be explained more in detail below.

More precisely, when the calibration means are activated, the generating means MPMA are actually connected to the OFDM modulator IFFTM and the peak detector is actually connected to the output of the power amplifier stage PA. When the calibration means are not activated, the power amplifier stage PA is actually connected to the antenna ANT and the multiplication means MLTM are actually connected to the OFDM modulator IFFTM.

The processing means PRM may be realized by software within a microcontroller or by a specific ASIC. The calibration control means CLCTM may be realized by logic circuits, for example.

Further, in the described example, the calibration control means CLCTM are adapted to activate the calibration means CLM upon reception of a control signal CSGN delivered by a high level algorithm, for example, the MAC layer of the communication interface of the wireless transceiver WPA.

Figure 4:
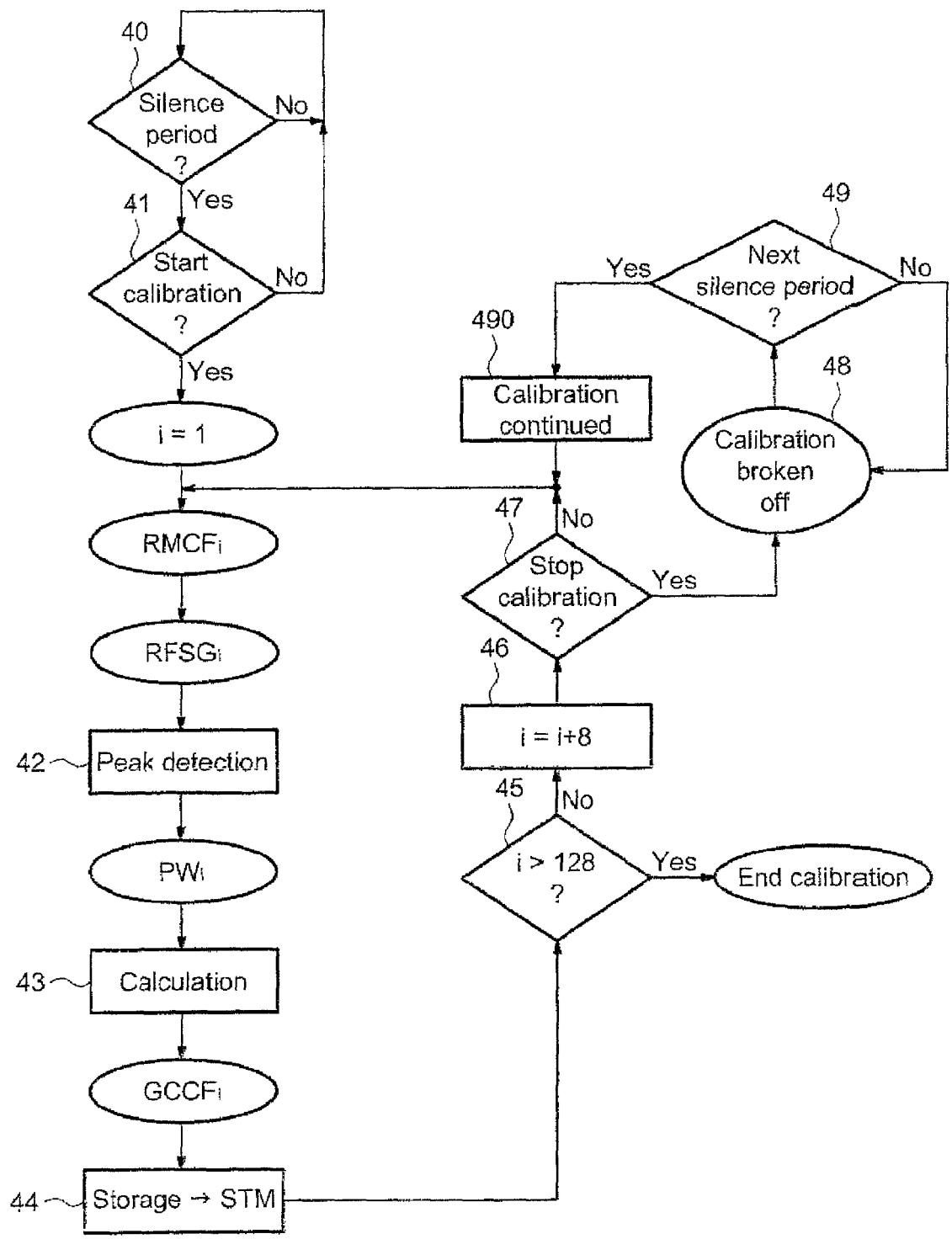
FIGS. 4 and 5 respectively illustrate flow charts related to a method according to the invention.
Figure 5:
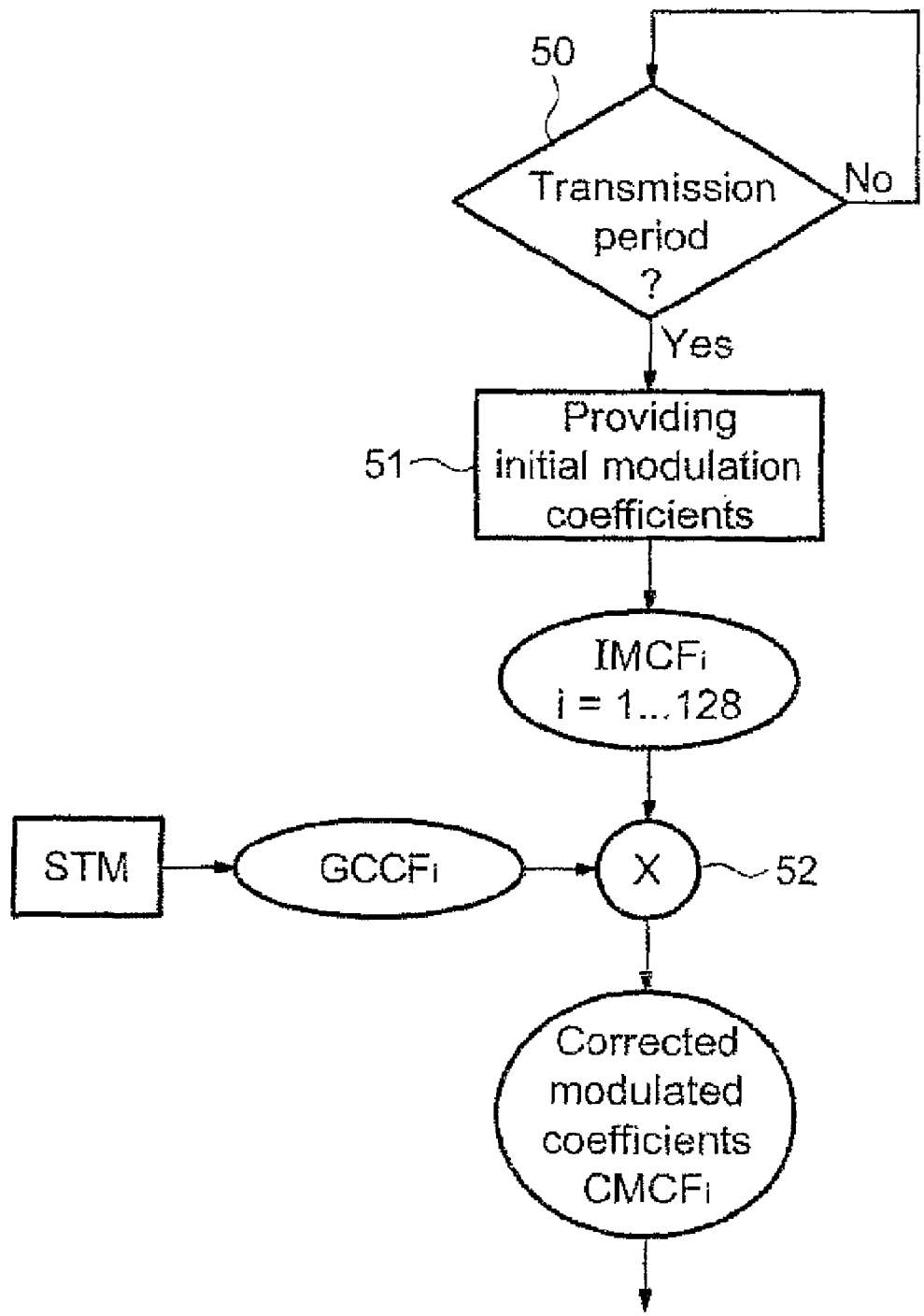

The operation of the transceiver, and more particularly the calibration means, will be now described more in detail with reference to FIGS. 4 and 5. In WLANs or similar wireless systems, the transmission is performed in packet mode, which means that data and signaling are sent by subsequent bursts of modulated waveform followed by periods of silence, the minimum duration of which is determined in the related standard. For proper operation, at least some steps of the calibration occur during silence periods, implying the following consequences: detection of the start of a silence period after any transmit or received packet, and detection of the end of a silence period and any tone measurement ongoing at this time must be stopped instantaneously, or (preferably) the duration of a tone measurement must be shorter than the minimum silence period duration (often called SIFS for Short IFS).

Two different approaches are possible for triggering the measurement process at the PHY level:

a) The control process determines after which specific frame (e.g., beacon frames or equivalent in TDMA based networks) the measurement process must occur and presets this start condition in the baseband stage. This is advantageous when the number of measurements per unit of time must be controlled, e.g., for power saving management, and b) the base band digital stage autonomously detects the next start of a silence period and then automatically processes the tone measurement.

The minimum guaranteed silence period (SIFS) is generally very short, and the calibration tone generation/measurement are chosen to be short enough to be comprised in a silence period.

An algorithm will be described below in the case of TDMA WLANs, where specific messages (e.g. beacon packets) are transmitted frequently enough. This corresponds to the approach a).

It has to be noted that in non-TDMA networks (e.g., non-deterministic occurrence of packets), either the network is heavily loaded, meaning that packets and therefore silence periods are very frequent, resulting in approach b), or the network is moderately or lightly loaded, resulting in approach a) or in a combination of approach a) and approach b).

Here an algorithm is presented in the case of TDMA based wireless networks, where the TDMA cycle is short compared to the variation of the parameters impacting the spectrum flatness of the transmitter.

A numerical example extracted from MBOA UWB WPAN is as follows:

the basic TDMA cycle period is 65.536 ms, and at least one specific message called beacon starts each cycle, followed by more messages (typically many). The beacon message is easily detectable by the protocol layer (above the PHY layer), the silence period duration (IFS for Interframe Spacing) after each sent packet (called frame at the PHY layer level) is about 10 µs, in semiconductor realizations, most of the transmit spectrum flatness variation is caused by temperature variation, and results in significant changes only after a few seconds or more, and there are 3*128 tones (3 sub-bands) and no noticeable variation in spectrum can be detected within an adjacent group of 4 to 8 tones, meaning that one measurement per 4 to 8 adjacent tones is sufficient.

Although there is a silence period between the OFDM symbols (each including 128 tones), respectively transmitted within the three sub-bands, this silence period (about 10 ns) is too short for performing the tone measurement of the calibration phase.

Accordingly, in the present example, the silence periods within which a calibration phase is performed are the interframe spacings.

After the transceiver has been powered on and before any transmission of the UWB signal, a set of initial values for a gain correction coefficients are stored in the storage means STM. These initial values may result from an in-production calibration. These initial values are determined, for example, to obtain a spectrum flatness of the transmitter together with an optimum level of transmitted power.

As illustrated in FIG. 4, the calibration phase starts within a silence period. However, since for example in the MBOA UWB WPAN example, there is no significant changes in the spectrum flatness due to temperature variation after a few seconds or more, it is not necessary to start a calibration within each silence period but for example every three or four seconds.

It is now assumed that in step 41, the calibration has started. For i=1, i.e., for the first tone of frequency of sub-carrier, a reference modulation coefficient $RMCF_i$ associated to this chosen sub-carrier, is generated by the generating means MPMA. This reference modulation coefficient in the frequency domain is in fact here a chosen constant defining a chosen sub-carrier amplitude coefficient.

If the generating means are analogous to the mapping means MPM, generating one coefficient for one sub-carrier is equivalent to canceling all other tones, i.e., to delivering zero on all the outputs of the generating means MPMA except for the output associated to the chosen sub-carrier.

Of course, any other forms of OFDM tone generators MPMA can be used, e.g., a CORDIC circuitry (circuitry adapted to perform a well-known Coordinate Rotation Digital Computer algorithm). After a frequency domain to time-domain conversion and a digital-to-analog conversion as well as an RF processing, the corresponding reference signal $RFSG_i$ is delivered at the output of the amplifier stage PA.

The peak detector PD performs a peak detection (step 42) of this reference signal. The result of this peak detection is a power information $PW_i$, which represents the amplitude of this reference signal. As the calibration is performed tone per tone, only one sine wave corresponding to a single frequency is sent within the transmission chain. Thus, detecting the maximum value of the corresponding signal thanks to the peak detector permits to obtain very simply the power information related to the energy or level of the signal.

Then, the processing means PRM calculates from this power information $PW_i$ and from the reference modulation coefficient $RMCF_i$, a relative attenuation value of the signal.

Then, the inverse of this relative value is multiplied (step 43) by the initial value of the corresponding coefficient associated to this sub-carrier for obtaining a gain correction coefficient which is stored in the corresponding register associated to the sub-carrier (step 44).

This gain correction coefficient is referenced $GCCF_i$. Of course, if "i" is greater than 128, then the calibration is stopped (step 45). On the contrary, the calibration is continued by incrementing "i" with 8 (step 46). As indicated above, there is no noticeable variation spectrum within an adjacent group of 8 tones, for example. In other words, the gain correction coefficient GCCF1 calculated for sub-carrier 1, is also available for sub-carriers 1-8.

The calibration process is continuing (steps 42-46) as long as the silence period is not finished. However, if during the calibration processing, the end of the silence period is detected, the calibration is broken off (step 48) until the next silence period (step 49) where the calibration is continued (step 490).

In the present example, all the steps of the calibration phase are performed within one or several silence periods. However, theoretically, only the generation of the reference modulation coefficients as well as the peak detections, are performed within the silence periods. As a matter of fact, the other steps of the calibration phase, i.e., the calculation of the gain correction coefficients, (as well as their storage in the storing means) may be performed within transmission periods.

Turning now to FIG. 5, it can be seen that during the transmission period, the initial modulation coefficients $IMCF_i$ (i=1 . . . 128), which are provided (step 51) from the mapping means MPM, are corrected by the corresponding gain correction coefficients GCCFi stored in the storing means. More precisely, the initial modulation coefficients IMCFi are respectively multiplied by the corresponding gain correction coefficients GCCFi for obtaining corrected modulated coefficients CMCFi which will be delivered to the OFDM modulator IFFTM.

As long as a new gain correction coefficient has not been computed and stored in the storage means STM, the initial modulation coefficients provided by the mapping means MPM are corrected with the previous content of the storage means.

That which is claimed:

1. A method of transmitting a signal from a transmission chain of a wireless transceiver during transmission periods separated by silence periods, the method comprising:
    performing a transmission phase during the transmission periods comprising providing initial modulation coefficients in a frequency domain, and respectively modulating sub-carriers to be transmitted from the initial modulation coefficients;
    associating a storage area to each sub-carrier;
    performing a calibration phase comprising
        a) providing a reference modulation coefficient in the frequency domain associated with a chosen sub-carrier, and dynamically measuring power of a corresponding reference signal delivered to the transmission chain, during a silence period,
        b) calculating from a result of the measurement and from the reference modulation coefficient, a gain correction coefficient for that sub-carrier,
        c) storing the calculated gain correction coefficient in the storage area associated with the sub-carrier, and
        d) repeating steps a) to c) for other chosen sub-carriers, with step a) respectively being associated to all chosen sub-carriers performed during a silence period; and
    performing the transmission phase further comprising correcting the initial modulation coefficients with contents of the corresponding storage areas.

2. A method according to claim 1, wherein steps b) and c) are also performed during at least one silence period.

3. A method according to claim 1, wherein the transmission chain comprises a power amplifier stage, and wherein the reference signal is delivered after the power amplifier stage.

4. A method according to claim 1, wherein measuring the power of the reference signal comprises performing a peak detection of the reference signal.

5. A method according to claim 1, wherein the storage areas are part of a storage device; and
    wherein the calibration phase comprises storing after the transceiver has been powered on and before any transmission of the signal, a set of initial values for the gain correction coefficients in the storage device.

6. A method according to claim 1, wherein the signal comprises a UWB signal modulated according to an MB-OFDM modulation scheme.

7. A method according to claim 6, wherein the silence periods are spaces separating successive transmission frames.

8. A method according to claim 1, wherein the gain correction coefficient calculated in step b) is valid for a group of n adjacent sub-carriers including a chosen sub-carrier, the calculated gain correction coefficient being stored in the storage area associated to the group, and step d) comprises successively repeating steps a) to c) for each respective sub-carrier chosen among successive respective adjacent groups of n sub-carriers.

9. A method according to claim 1, further comprising starting the calibration phase upon reception of a control signal.

10. A wireless transceiver comprising:
    a transmission chain comprising
        a mapping device to deliver initial modulation coefficients in a frequency domain,
        an antenna to transmit a signal comprising sub-carriers respectively modulated based on the initial modulation coefficients,
        a controller to authorize the transmission during transmission periods separated by silence periods,
        a calibration device comprising
            a storage device comprising storages areas, each storage area being associated with a sub-carrier,
            a generating device to deliver a reference modulation coefficient in the frequency domain associated with a chosen sub-carrier,
            a measurement device to dynamically measure power of the reference signal corresponding to the reference modulation coefficient, and
            a processing device to calculate from a result of the measurement and from a value of the reference modulation coefficient a gain correction coefficient for that sub-carrier, and to store the calculated gain correction coefficient in said storage area associated with the sub-carrier;
        a calibration control device to activate at least said generating device and said measurement device during at least one silence period for several chosen sub-carriers, and
        a correction device connected to an output of said mapping device and to said storage device and to correct each initial modulation coefficient with a content of the corresponding storage area.

11. A wireless transceiver according to claim 10, wherein said calibration control device activates said calibration device during the at least one silence period for the chosen sub-carriers.

12. A wireless transceiver according to claim 10, wherein said correction device comprises a multiplier.

13. A wireless transceiver according to claim 10, further comprising a power amplifier stage; and wherein the reference signal is delivered after the power amplifier stage.

14. A wireless transceiver according to claim 10, wherein said measurement device comprises a peak detector.

15. A wireless transceiver according to claim 14, wherein said calibration device further comprises a controllable coupling device connected between the power amplifier stage and said measurement device; and wherein said calibration control device controls said controllable coupling device such that said measurement device is coupled to said controllable coupling device.

16. A wireless transceiver according to claim 10, wherein said storage device stores a set of initial values for the gain correction coefficients.

17. A wireless transceiver according to claim 10, wherein the signal comprises a UWB signal modulated according to an MB-OFDM modulation scheme.

18. A wireless transceiver according to claim 17, wherein the silence periods are spaces separating successive transmission frames.

19. A wireless transceiver according to claim 10, wherein the calculated gain correction coefficient is valid for a group of n adjacent sub-carriers including the chosen sub-carrier, said calculated gain correction coefficient being stored in said storage area associated with the group, and said calibration control device respectively activates said calibration device during at least one silence period for respective sub-carriers chosen among successive respective adjacent groups of n sub-carriers.

20. A wireless transceiver according to claim 10, wherein said calibration control device activates said calibration device upon reception of a control signal.

21. A wireless transceiver comprising:
a mapping device for providing initial modulation coefficients in a frequency domain for sub-carriers;
a controller for authorizing transmission of a signal during transmission periods separated by silence periods,
a calibration device comprising
a storage device comprising storage areas, each storage area being associated with a sub-carrier,
a generating device for providing reference modulation coefficients in the frequency domain associated with a chosen sub-carrier,
a measurement device for dynamically measuring power of the reference signal corresponding to the reference modulation coefficient, and
a processing device to calculate from a result of the measurement and from a value of the reference modulation coefficient a gain correction coefficient for that sub-carrier, and to store the calculated gain correction coefficient in said storage area associated with the sub-carrier;
a calibration control device to activate at least said generating device and said measurement device during at least one silence period for several chosen sub-carriers, and
a correction device connected to said mapping device and to said storage device and to correct each initial modulation coefficient with a content of said storage area.

22. A wireless transceiver according to claim 21, wherein said calibration control device activates said calibration device during the at least one silence period for the chosen sub-carriers.

23. A wireless transceiver according to claim 21, wherein said correction device comprises a multiplier.

24. A wireless transceiver according to claim 21, further comprising a power amplifier stage; and wherein the reference signal is delivered after the power amplifier stage.

25. A wireless transceiver according to claim 21, wherein said measurement device comprises a peak detector.

26. A wireless transceiver according to claim 25, wherein said calibration device further comprises a controllable coupling device connected between the power amplifier stage and said measurement device; and wherein said calibration control device controls said controllable coupling device such that said measurement device is coupled to said controllable coupling device.

27. A wireless transceiver according to claim 21, wherein said storage device stores a set of initial values for the gain correction coefficients.

28. A wireless transceiver according to claim 21, wherein the signal comprises a UWB signal modulated according to an MB-OFDM modulation scheme.

29. A wireless transceiver according to claim 21, wherein the calculated gain correction coefficient is valid for a group of n adjacent sub-carriers including the chosen sub-carrier, said calculated gain correction coefficient being stored in said storage area associated with the group, and said calibration control device respectively activates said calibration device during at least one silence period for respective sub-carriers chosen among successive respective adjacent groups of n sub-carriers.

30. A wireless transceiver according to claim 21, wherein said calibration control device activates said calibration device upon reception of a control signal.

* * * * *

UNITED STATES PATENT AND TRADEMARK OFFICE
CERTIFICATE OF CORRECTION

| | | |
|---|---|---|
| PATENT NO. | : 7,804,908 B2 | Page 1 of 1 |
| APPLICATION NO. | : 11/686545 | |
| DATED | : September 28, 2010 | |
| INVENTOR(S) | : Cattaneo et al. | |

It is certified that error appears in the above-identified patent and that said Letters Patent is hereby corrected as shown below:

Column 2, Line 49            Delete: "also better"
                             Insert: --also be better--

Column 4, Line 48            Delete: "work in"
                             Insert: --work are in--

Column 4, Line 51            Delete: "UWE"
                             Insert: --UWB--

Column 5, Line 57            Delete: "explain"
                             Insert: --explained--

Column 8, Line 7             Delete: "of sub-carrier"
                             Insert: --of a sub-carrier--

Column 10, Line 13           Delete: "storages"
                             Insert: --storage--

Signed and Sealed this
Twelfth Day of July, 2011

David J. Kappos
*Director of the United States Patent and Trademark Office*